United States Patent
Bednarz et al.

(10) Patent No.: US 7,120,238 B1
(45) Date of Patent: Oct. 10, 2006

(54) SENSOR-CONTROLLED TELEPHONE SYSTEM

(75) Inventors: Philip Bednarz, Fremont, CA (US); John L. Barrett, San Jose, CA (US)

(73) Assignee: 8x8, Inc., Santa Clara, CA (US)

( * ) Notice: Subject to any disclaimer, the term of this patent is extended or adjusted under 35 U.S.C. 154(b) by 763 days.

(21) Appl. No.: 10/041,755

(22) Filed: Jan. 7, 2002

Related U.S. Application Data

(63) Continuation-in-part of application No. 09/905,161, filed on Jul. 12, 2001.

(51) Int. Cl.
*H04M 3/42* (2006.01)

(52) U.S. Cl. .............................. 379/201.1; 379/207.12; 455/456.1

(58) Field of Classification Search ........... 379/201.01, 379/201.06, 301.07, 301.09, 201.1, 207.02, 379/207.12, 211.02, 201.07, 207.09; 455/456.1, 455/456.3, 456.5, 456.6, 457

See application file for complete search history.

(56) References Cited

U.S. PATENT DOCUMENTS

| | | | |
|---|---|---|---|
| 4,649,385 A * | 3/1987 | Aires et al. ................. 379/56.3 |
| 4,658,416 A * | 4/1987 | Tanaka ........................ 455/417 |
| 4,932,050 A * | 6/1990 | Davidson et al. ....... 379/211.02 |
| 5,019,802 A | 5/1991 | Brittain et al. |
| RE33,824 E | 2/1992 | Johnson |
| 5,189,393 A | 2/1993 | Hu |
| 5,406,255 A | 4/1995 | Fujimoto et al. |
| 5,475,365 A | 12/1995 | Hoseit et al. |
| 5,532,680 A | 7/1996 | Ousborne |
| 5,533,113 A * | 7/1996 | Ozawa et al. ........... 379/201.07 |
| 5,548,637 A * | 8/1996 | Heller et al. ........... 379/201.07 |
| 5,581,236 A | 12/1996 | Hoseit et al. |
| 5,596,633 A * | 1/1997 | Meier et al. .............. 379/201.1 |
| 5,712,911 A * | 1/1998 | Her ......................... 379/388.01 |
| 5,781,108 A | 7/1998 | Jacob et al. |
| 5,822,418 A * | 10/1998 | Yacenda et al. ........ 379/201.07 |
| 5,923,252 A | 7/1999 | Sizer et al. |
| 5,982,860 A * | 11/1999 | Kim ....................... 379/100.15 |
| 6,009,333 A * | 12/1999 | Chaco ...................... 455/456.5 |
| 6,078,253 A | 6/2000 | Fowler |
| 6,211,782 B1 | 4/2001 | Sandelman et al. |
| 6,480,593 B1 * | 11/2002 | Munday et al. ......... 379/211.02 |
| 6,546,096 B1 * | 4/2003 | Meiden et al. .......... 379/209.01 |
| 6,842,505 B1 * | 1/2005 | Suder et al. ............. 379/88.01 |

* cited by examiner

*Primary Examiner*—Harry S. Hong

(57) ABSTRACT

A telephony system and method are adapted for selecting an operating mode of a telephony system responsive to sensor inputs. A presence detector, communicatively coupled to the telephony system, detects people within a predetermined area associated with the telephony system. A detection signal is communicated to the telephony system responsive to a detection. The telephony system is operated in a first operating mode absent the detection signal, and in a second operating mode responsive to the detection signal. A system status display indicates a first data set in the first operating mode, and a second data set in the second operating mode, the second data set being different from the first data set. In a more particular implementation, a central station displays status information for remote telephone devices reflective of a user's presence. In another particular implementation, telephony system call routing is modified responsive to detected user presence and/or identity.

24 Claims, 2 Drawing Sheets

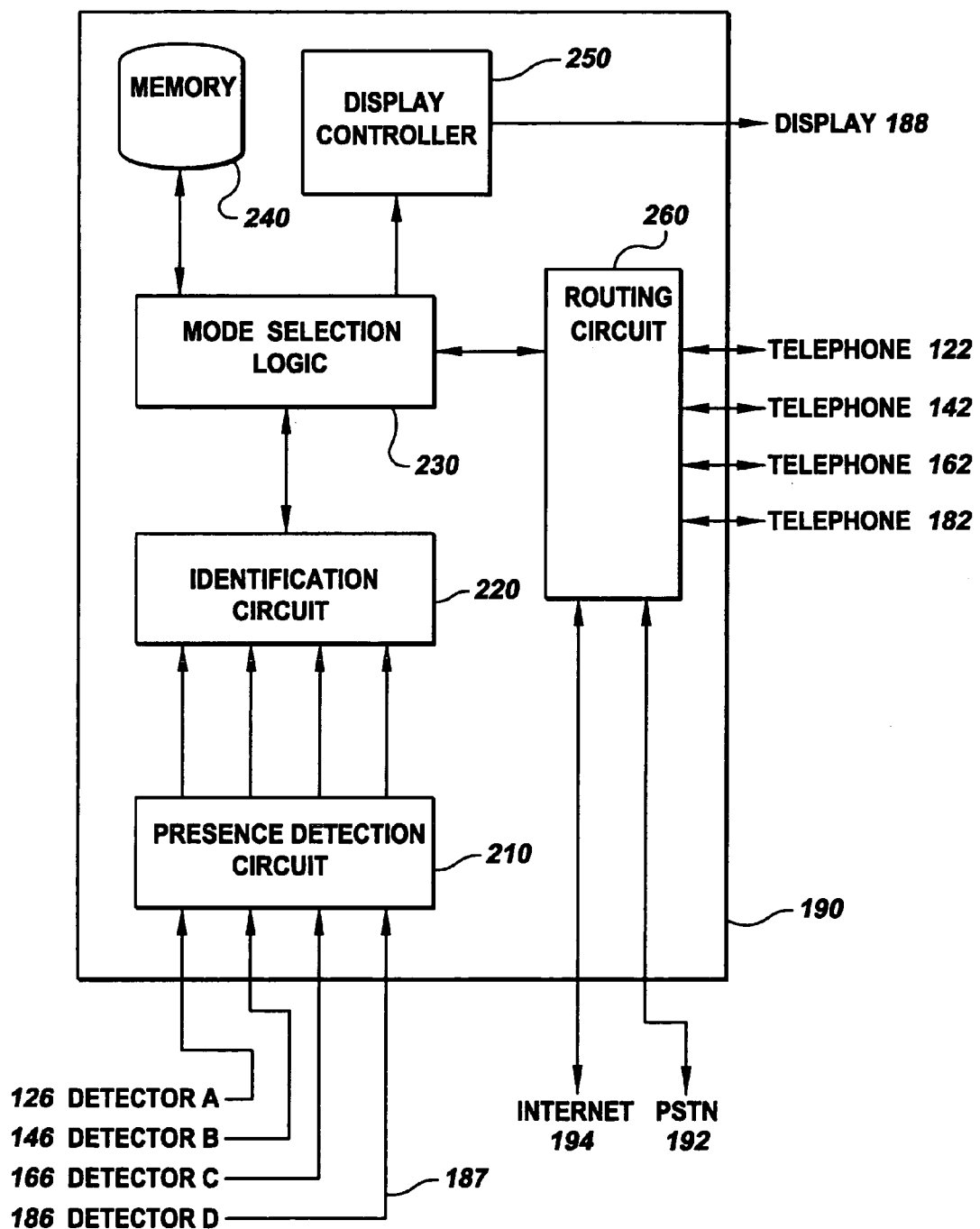

SENSOR-CONTROLLED TELEPHONE SYSTEM

This is a continuation-in-part of U.S. patent application Ser. No. 09/905,161, entitled "Data Security Apparatus and Method Therefor," filed on Jul. 12, 2001, to which priority is claimed for common subject matter under 35 U.S.C. § 120. This application is also related to U.S. patent application Ser. No. 09/966,713, entitled "Distributed Local Telephone Gateway," filed on Sep. 28, 2001. Additionally, this application is related to U.S. Patent Application Ser. No. 60/345,258, entitled "Virtual Telephone Extension," filed on Jan. 2, 2002, and to concurrently-filed Ser. No. 10/041,756, entitled "Data Security Apparatus and Method Therefor." The above-mentioned related applications are fully incorporated herein by reference.

FIELD OF THE INVENTION

The present invention relates to telephony systems, and more particularly, to using sensors to control a telephony system configuration and operation.

BACKGROUND OF THE INVENTION

The communications industry continues to rely upon advances in technology to realize higher-functioning systems at cost-effective prices. Telephony signals can now be transmitted by methods and systems including traditional publicly-switched telephone networks (PSTN), Internet telephony service providers (ITSP) deploying Voice-over-Internet protocol (VoIP) technologies through a broadband data network, packet-based systems, digital wireless systems, analog wireless systems, private branch exchanges (PBX), cable systems, T1 systems, integrated service digital networks (ISDN), and digital subscriber line (DSL) systems, to name a few. Widespread acceptance and usage of communication systems and services are largely a function of cost and user convenience.

The scalability of a communications system weighs heavily upon the acceptance of the system. As the face of today's mobile society and workplace is changing, the ability to provide flexible communications services is becoming increasingly important. Many people are highly mobile on a daily basis, traveling for business, working from several locations, such as base office, branch office, home and field locations. A variety of tools and methods are conventionally used to coordinate telephone communications. Continuously updating a secretary or voice mail greeting with a user's current whereabouts and a nearby telephone number is typical. Callers trying to reach the user at the user's published telephone number are provided the user's updated location information and required to make a second call to track down the party they are attempting to reach. Alternately, pagers alert a user that a caller is attempting to reach the user, providing a contact telephone number for the user to initiate a return call in order to establish a connection. Cellular telephones provide mobile telephone service that follows a user, but pager and cell phone services are expensive and rely on sufficiently-charged batteries to power the mobile equipment. Mobile area coverage is uncertain and call quality is typically lower than for hard-wired communication systems.

To accommodate ongoing communications needs, a user-friendly reconfigurable telephony system would be advantageous. Accordingly, there is a need for a flexible and cost-effective approach for providing seamless telephony services to a plurality of reconfigurable destinations, including fixed and mobile user interfaces. Such an approach should take into consideration end-users' expectations of accessing any other telephone in the world using existing telephone equipment, user interfaces and user calling paradigms. A telephony system and method that address the aforementioned problems, as well as other related problems, are therefore desirable.

SUMMARY OF THE INVENTION

The present invention is directed to a sensor-controlled telephony system and method, and the related need for reconfiguring the telephony system by selecting an operating mode responsive to presence detection thereby providing increased system flexibility and efficiency.

According to one example embodiment, a telephony system and method selects an operating mode of a telephony system responsive to sensor inputs. A presence detector, communicatively coupled to the telephony system, detects people within a predetermined area associated with the telephony system. A detection signal is communicated to the telephony system responsive to the detection. The telephony system is operated in a first operating mode absent the detection signal, and in a second operating mode responsive to receipt of the detection signal.

According to an aspect of the present invention, a first data set is displayed in the first operating mode, and a second data set is displayed in the second operating mode. In one implementation, the second data set is different from the first data set. The first and second data sets are displayed in the predetermined area (e.g., on a telephone set located in the predetermined area), on a display remote to the predetermined area, or both. The first and second data sets each include occupancy information for the predetermined area, and telephony system operational mode information, for example status of a telephone device located within the predetermined area.

In a more particular example embodiment of the present invention, telephony system call routing is modified responsive to detected presence, or detected presence including identification. Calls designating a destination identifier are routed to a first telephone device in the first operating mode, and to a second telephone device in the second operating mode. According to one implementation, the second telephone device is a telephone set located within the predetermined area. According to another implementation, the first telephone device is a voice mail box, cellular telephone, pager, or telephone set located outside the predetermined area.

According to a further aspect of the present invention, the first and second telephone devices are selected responsive to a call's destination identifier and the detected presence of at least one identified person.

Other aspects of the present invention are directed to example method and application-specific implementations relating to the above embodiments. The above summary is not intended to characterize each embodiment of the present invention. Other aspects of the present invention are provided by way of example upon review of the figures and corresponding description of the drawings.

BRIEF DESCRIPTION OF THE DRAWINGS

Other aspects and advantages of the present invention will become apparent upon reading the following detailed description and upon reference to the drawings in which:

FIG. 2 illustrates an example telephony system controller, according to an example embodiment of the present invention.

Figure 1:
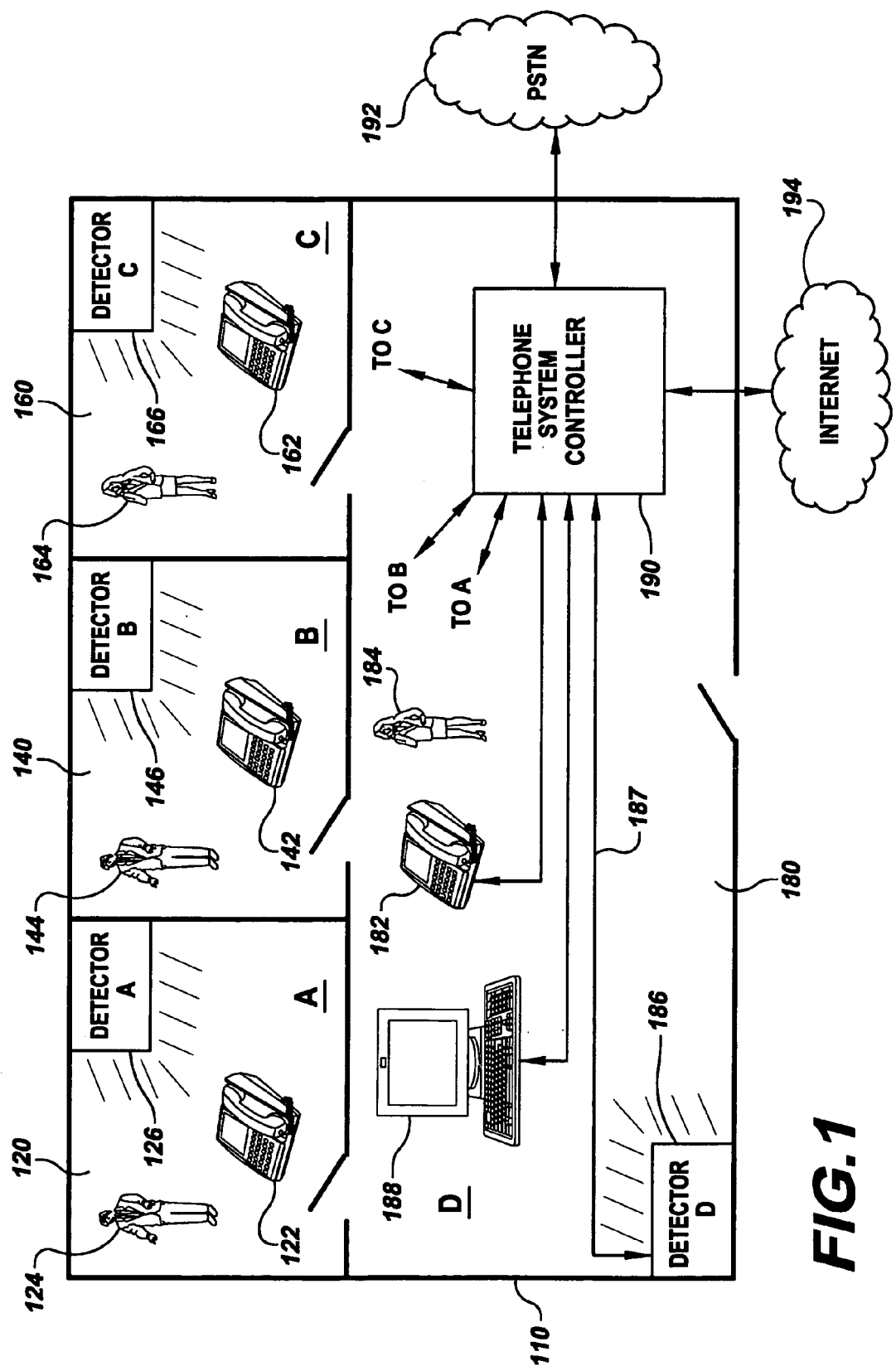
FIG. 1 illustrates an example office environment using a sensor-controlled telephony system, according to an example embodiment of the present invention.

While the invention is susceptible to various modifications in alternative forms, specific embodiments thereof have been shown by way of example in the drawings and will herein be described in detail. It should be understood, however, that it is not intended to limit the invention to a particular form disclosed. On the contrary, the invention is to cover all modifications, equivalents, and alternatives falling within the spirit and scope of the invention as defined by the appended claims.

DETAILED DESCRIPTION

The present invention is applicable to telephony systems, and more particularly to telephony applications in which the telephony system configuration and/or operation are supervised by an area sensor to dynamically reconfigure the operating mode of the telephony system. While the present invention is not necessarily limited to such circuits and devices, an appreciation of various aspects of the invention is best gained through a discussion of various examples using this application.

According to a general example embodiment of the present invention, at least one presence detector is communicatively coupled to a telephony system, operation of the telephony system being supervised by the at least one presence detector. The presence detector is arranged and configured to monitor a predefined area by various techniques, and communicate a "presence" signal to the telephony system when the presence of at least one person within the monitored area is detected. The telephony system is further configured and arranged to select the telephony system's operating mode responsive to receiving the presence signal.

In one example implementation, the telephony system operates in a first operating mode absent receipt of a particular presence signal, and the telephony system operates in a second operating mode upon receipt of the particular presence signal. According to one aspect, a first data set is displayed in the first operating mode, and a second data set is displayed in the second operating mode, the second data set being different than the first data set.

In another example implementation of the present invention, at least one presence detector is communicatively coupled to a telephony system. The operating mode of the telephony system is determined responsive to the at least one presence detector(s). Each presence detector is arranged to monitor a predefined area, such as an office area, and communicate an "occupied" signal for the respective area to the telephony system upon detection of the presence of at least one person within the detector's monitored area. The telephony system is programmed to select the telephony system's operating mode responsive to receiving the occupied signal, for example by reconfiguring call routing paths or operational features, such as voice mail activation.

In another example application, the telephony system includes a central system status display, at least one remote telephone device, and at least one presence detector all coupled to the telephony system. According to one aspect, at least one remote telephone device is supervised by at least one associated presence detector. In one implementation, the presence detector monitors an area associated with a particular telephone device, for example an area within which a telephone device is located. In another implementation, the presence detector monitors an area not associated with a particular telephone device.

A presence detector communicates an "occupied" signal to the telephony system for a given monitored area when the area monitored by the presence detector is occupied by at least one person. Selection of an operating mode for the telephony system is responsive to respective telephone devices having an associated area detected as "occupied." A central system status display station indicates status of respective telephone devices reflective of occupancy of areas associated with the telephone device. In one implementation, a receptionist station includes a display indicating the status for each of a plurality of remote telephone devices, each having a respective associated area monitored for presence. For each respective remote telephone device, the central system status display station displays a first data set corresponding to a telephone device absent receipt of an occupied signal from a presence detector associated with the telephone device. The central system status display indicates a second data set corresponding to a telephone device upon receipt of an occupied signal from the associated presence detector. Each data set incorporates information reflective of the telephony system configuration, operational status and occupancy detections.

In a more specific example application of the present invention, a plurality of employee offices are each equipped with a telephone device and an associated presence detector. Each presence detector monitors an associated office area for presence of at least one person, the person being assumed to be an employee to which the particular telephone device and associated office (area) are assigned.

According to one example implementation, a receptionist's central system status display station uses indicator lights of various colors and illumination patterns, for example steady-on, off, blinking, or intensity variations, to indicate information concerning the status of each telephone device. When an area monitored by a presence detector, associated with a particular telephone device, does not detect occupancy within the monitored area, status lights are extinguished for example, at the central display corresponding to the particular telephone device. The specific manner in which a particular condition is indicated can be implemented in any number of unique and discernable signals. The example implementations set forth herein are intended to demonstrate one of many possible signal methods.

Off-hook status of the telephone device without an occupancy detection is another possible condition that can be uniquely indicated. Any other telephone device features and/or conditions can likewise be supervised based upon presence and appropriately indicated, for example activation of call-forwarding, immediate call transfer to voice mail, "do not disturb," and/or telephone device malfunction. Awareness, through indication, of the aforementioned conditions is beneficial to users as an aid to discovery and correction of undesired telephone device conditions and configurations. Telephone device, and/or telephony system features are optionally indicated by distinct color, sound, data display, graphics, symbol and/or illumination patterns.

According to another example implementation, a telephone device is turned off to effect a "do not disturb" function, or the telephony system executes predetermined default feature(s) when a user's presence is not detected in an area associated with a particular telephone device. A user can elect to turn "off" a telephone device, the telephone device's "off" status being uniquely indicated at the central display.

When occupancy of a monitored area associated with a particular telephone device is detected by a presence detector, a unique set of light/illumination patterns is displayed to reflect information concerning the configuration and/or operational status of the particular telephone device. The unique display set is made different from those of a display set that are displayed when occupancy is not detected. For example, a green light is displayed at a central status display to indicate that a telephone device is off-hook and the area associated with the off-hook telephone device is occupied (e.g., to indicate that the detected person is likely using the telephone device). A blue light is displayed for example, to indicate that the telephone device is on-hook with the associated area occupied, and therefore available to receive calls. In one example implementation, displayed light signals are located at the particular telephone device, thereby communicating telephony system status to a local user. In another implementation, in addition to or in lieu of local indication, displayed light signals are located, at a central display station to communicate status of the particular telephone device to a supervising operator.

Light colors/patterns/intensities displayed at the central display station, and/or locally at a telephone device, are similarly unique for optional telephone device features, the feature indications being reflective of detected presence to communicate more detailed information about the telephony system. For example, a yellow light is displayed to signal that a telephone device has call-forwarding activated and the associated area not occupied, to indicate that the telephony system is appropriately dispositioning calls in a user's absence. A red light is displayed for example, to signal that the telephone device has call-forwarding activated while the associated area is occupied to indicate a potentially unwanted telephony system operational condition (e.g., although a user is nearby a particular telephone device to answer incoming calls, no calls will be received at the telephone device since they are being re-directed by the telephony system to another telephone device).

Certain attention-drawing indication characteristics, for example red-colored signals, are optionally used as an alert for pre-defined scenarios classified as unusual, scenarios that likely merit further human inquiry. A sensor-controlled telephony system according to the method of the present invention, in particular occupancy-dependent local and remote display indications, provide additional information to users and other system-monitoring personnel over information available via a conventional telephony system. Additionally, dynamic system status indication reflecting presence-detection of areas associated with the telephony system increases efficiency, for example in attempting to contact telephony system users in remote office areas, and in filtering or otherwise dispositioning inquiry calls received by a central station operator or receptionist.

In a more particular example implementation, telephony system status including presence detection of areas associated with the telephony system, are indicated via a graphical display. The graphical display is implemented using text, symbols, colors, arrangements, diagrams, highlighting or other symbolic communication techniques. According to a more particular example implementation, the graphical display is implemented through a computer data network display, arranged and configured to be viewable by a plurality of authorized parties. The computer-implemented display optionally functions as an "in/out board" indicative of the status of various telephone areas (e.g., offices, from which status of the assigned employees can be inferred). Telephone system status is integrated into the information communicated via the electronic in/out board in a further implementation, for example communicating information about telephone devices associated with each monitored area (and assigned employee). The in/out board display is dynamically modified according to occupancy detection in the monitored areas, and further dynamically modified according to configuration and operating mode of associated telephone devices located in said monitored areas.

In a further example general embodiment of the present invention, a person identifies himself to the telephony system, for example to a particular telephone device. In one example implementation, a person uses an identifier card, or other unique identifying device, to identify himself as a user to a telephone device through a pre-defined transaction between the identifying device and the telephone device. Alternatively, a person is identified through a presence detector capable of detecting presence and passively determining the identity of the person being detected in a monitored area. According to one example implementation, an identifying device such as a card or badge having identifying information, is detected by the presence detector. The in/out board function described above indicates the location of a detected presence for each person possessing an identifying device. The status indication of each telephone device is modified according to identity information of people occupying the area associated with each particular telephone device. For example, a graphical telephony system status display can indicate the identities of users whose calls are being directed to a particular telephone device, based upon the users' presence being detected within an area associated to the particular telephone device.

According to one aspect, viewing access is controlled to the "in/out board," the board being physically- and/or electronically-implemented. The location and/or status information for individuals (e.g., "on the telephone," as determined by presence plus off-hook conditions) is available to a plurality of authorized users, and indicated for example, by a status symbol appearing corresponding to an individual's name on the in/out board display. In a more particular implementation, an alpha-numeric display associated with a particular telephone device at a central status display station, indicates the identity of each person detected in the area associated with the telephone device. The alpha-numeric display is for example, a liquid crystal or computer-implemented display, the display being modified responsive to presence detection to include appropriate identity information. In an alternative implementation, an alpha-numeric display associated with each person is included on central status display station, displays indicating for example, a telephone device identifier and/or location identifier within which each person is detected and identified.

In another implementation, an individual's presence and identity is authenticated in a monitored area, as a condition precedent for a telephone device associated with the monitored area to be operational. In yet another implementation, an individual's presence and identity is authenticated in a monitored area for some particular feature of the telephone device to be operational, for example, long-distance calling or feature access control. For example, when used with Windows XP, this presence-responsive equipment is adapted to switch a user just by passing your finger or the sensor; this occurs in a manner that does not necessarily require booting up would be required in Windows XP and prior operating systems like the Windows 2000. Further, in a more specific embodiment, this presence-responsive equipment is adapted to automatically activate all passwords for Internet sites or other purposes, once you go through a lengthy set-up procedure. Accordingly, using any of these approaches taken alone or in combination, as long as the sensor can detect the presence of the target person, the presence-responsive equipment can provide access control to the user's personal identity as configured on the computer (e.g., Windows XP) and can provide automated activation of user codes and passwords for addressing the various Internet sites such as the User's financial accounts and subscription service accounts. Using a timeout monitor, e.g., on the keyboard, built into the user's web-site or screen-saver timeout, and/or in response to the user sensor ceasing detection of the user's presence, the equipment switches out of the user account and vitiates access to the passwords. This "cease-detection" approach is especially advantageous for applications in which there are concerns of security breaches by one-shot access input, e.g., one-shot access fingerprint ID that does not terminate access after the user walks away and/or forgets to log off or lock the computer. As a further optional modification, telephony system use is logged, corresponding to detected identities.

According to another example embodiment of the present invention, a telephony system determines the routing of telephone calls to a particular telephone device based upon detection of occupancy of the occupant(s) within an area associated with the particular telephone device, as described in the above patent document, "Virtual Telephone Extension." In one example implementation, a presence detector detects an assigned user's presence, or lack thereof, in an area associated with a particular telephone device. When the user is not detected present, incoming telephone calls are automatically forwarded to an alternate telephone device, for example to a cellular telephone or voice mail apparatus. When the presence detector detects a user being in the area of the telephone device, the user's telephone calls are routed to the telephone device. A "do not disturb" feature optionally overrides presence detection and automatically forwards incoming calls to the user's voice mailbox, for example.

In a further example implementation of the present invention, the presence detector passively identifies people whose presence is detected. According to one application, a presence detector detects a person's presence, then identifies that person in a monitored area associated with a particular telephone device. An individual's incoming telephone calls are subsequently forwarded to the associated telephone device at the individual's detected location. In one example implementation, telephone call forwarding is accomplished manually, for example by a receptionist after viewing a display providing the individual's location. In another example implementation, telephone calls are forwarded automatically by a telephony system controller adapted to dynamically select a telephony system operating mode responsive to user location information received via at least one presence detector coupled to the telephony system controller. Automatic and manual implementations are selectable in further implementation. In this manner telephone calls are routed based upon both the called party's identification and present location, not based upon a telephone device identifier (e.g., telephone number assigned to a telephone device or circuit).

Further aspects of the present invention include using distinctive telephone device ring tones to differentiate calls destined for particular users, each user's calls being signaled by one of a plurality of the distinctive ring tones. Using distinctive ring tones in connect with dynamic presence-based call forwarding, a user is able to receive calls forwarded to a nearby telephone device while away from their designated work area, the user being able to recognize their own distinctive ring tone from those of other individuals in the vicinity. Other distinguishing call-signaling techniques are contemplated by the present invention, for example a "caller ID" display not only indicating the calling party, but also indicating the called party identifying information.

In another example embodiment of the present invention, a clock is incorporated into an integrated office telephony management system. Telephony system use, the times of a person's presence associated with a particular telephony device, and/or duration of a person's presence in a monitored area is recorded in a data storage arrangement. For example, the amount of time during a workday that a user is at his workstation is documented.

FIG. 1 illustrates an example embodiment of a sensor-controlled telephony system 100, according to an example embodiment of the present invention. Office environment 110 includes office area A 120, office area B 140, office area C 160, and reception area D 180. Telephone set 122 is located in office A. User A 124 is assigned to, or routinely works in, office area A, which is monitored by detector A 126. Detector A monitors office area A, office area A being roughly define by the walls and door physically defining office area A. Detector A's zone of detection is coincident with office area A. Telephone set 142 is located in office B. User B 144 is assigned to, or routinely works in, office area B, which is monitored by detector B 146. Detector B monitors office area B, the monitored zone of detection being roughly defined by the walls and door defining office area B. Telephone set 162 is located in office C. User C 164 is assigned to, or routinely works in, office area C, which is monitored by detector C 166. Detector C monitors office area C, the monitored zone of detection being roughly defined by the walls and door defining office area C. Telephone set 182 is located in reception area D. User D 184 routinely works in reception area D, which is monitored by detector D 186. Detector D monitors reception area D, the monitored zone of detection being roughly defined by the walls and doors defining reception area D, including the doors leading to offices A, B, and C.

Telephone set 182 and detector 186 are communicatively coupled to a telephone system controller 190. Telephone sets and detectors for areas A, B, and C are similarly communicatively coupled to controller 190, although not shown completely coupled in FIG. 1 for simplicity. Controller 190 is communicatively coupled to a local PSTN 192, and/or a broadband data network 194, via which telephony system 100 can send and receive telephony signals with remote telephony devices, for example additional telephone sets, cellular telephones, computers, voice mail processors, among others. Additionally, telephony system status display 188 is also communicatively coupled to controller 190.

Although FIG. 1 depicts an office environment delineated by physical partitions, such as walls and doors, telephony system 100 is alternatively implemented in an open environment as well, whereby monitored areas are delineated by direction, range, type, sensitivity, and/or other controllable characteristics of the detectors coupled to the telephony system, along with any available physical boundaries.

Detector D is adapted to detect or sense the presence of one or more people entering and/or within a zone of detection, the zone of detection for detector D being reception area D. As a person enters, or presence is otherwise detected in zone 180, detector D transmits a detection signal to controller 190 indicating occupancy within zone 180. In response to the detection signal, controller 190 automatically reconfigures telephone system 100 and/or selects an appropriate operating mode. For example, telephony system call routing and/or electronically displayed telephony system status is modified responsive to a presence detected in area D.

Detectors A–D are communicatively coupled to controller 190 via a cable, electromagnetic signal, light signal, or other information-carrying signaling technique, for example detector D is coupled to controller 190 via datapath 187. In one example application, controller 190 is computer-implemented and receives detection signals via datapath 187 through an external port, for example a serial port, parallel port, $1^2C$ bus, RJ11, other standard or custom port. Controller 190 executes a detection software application to dynamically reconfigure telephony system 100 in response to a signal generated by detector D upon detecting an individual in the area monitored by the detector. The other detectors are coupled and operate in a like manner.

Depending on the type of sensing mode or mechanism used in detectors A–D, the configuration of a detector's zone of detection is configurable to meet the operational needs of a user. Detectors A–D detect presence using any of a variety of techniques applicable to a particular installation, for example heat, infra-red, reflected sonic waves, magnetic field changes, pressure, motion, light variations, sound, and other physical quantities, individually or in various combinations. In a further implementation, detectors A–D optionally also identify individuals whose presence is detected, for example each of users A–D.

When user A is detected (and identified) by detector A as being within area A, detector A signals controller 190, and controller 190 selects an appropriate operating mode, for example by electronically reconfiguring a call-routing application and/or memory. In one example embodiment, controller 190 includes a routing circuit adapted to route calls designating a destination identifier to a first telephone device in the first operating mode, and to a second telephone device in the second operating mode. Subsequently, calls intended for user A are routed to a telephone device nearest user A, for example telephone 122 in FIG. 1. Calls intended for an individual whose presence is not detected are routed to a pre-determined telephone device, a voice mail box for example.

In one example implementation, an incoming telephone call designating user A for example, is first routed to a general telephone circuit (e.g., receptionist's telephone 182), and subsequently manually re-routed to a telephone device (e.g., telephone 122) responsive to telephone system status as modified by occupancy information displayed on display 188. In another implementation, user A is provided a personal telephone system identifier (e.g., a personal telephone number unique to user A). Thereafter, incoming telephone calls designating user A's telephone system identifier are received by controller 190, the routing circuit directing the calls to a telephone device associated with the area user A's presence is detected within, for example telephone 122 as shown in FIG. 1.

Continuing with the operational scenario above, when user A leaves area A for a consultation with user C in area C, user A's presence is detected in area C by detector C. Incoming calls designating user A's telephone system identifier are routed (as described above) to telephone 162, rather than telephone 122 based upon the telephone system's detection of user A's presence. User A's calls are signaled by telephone 162 using a distinctive ring unique to user A, and user A has the option of answering telephone 162 just as if user A were sitting in his own office (i.e., area A). Alternatively, user A can elect not to answer a call on telephone 162, the call being subsequently routed to user A's (not user C's) voice mail account for further dispositioning.

Calls designating user C's telephone system identifier are also routed to telephone 162 since user C is also detected and identified as being present in area C. User C's calls are signaled by telephone 162 using a ring tone, display, or other means distinctive of user A's calls.

FIG. 2 further illustrates an example implementation of controller 190. Controller 190 receives signals from field-installed presence detectors for processing, for example via datapath 187. The signals may include identity information which is decoded by an identification circuit 220 coupled to presence detection circuit 210. A routing circuit 260 is communicatively coupled to local telephone devices (e.g., telephones 122, 142, 162 and 182), as well as the Internet 194 and the local PSTN 192. Routing circuit 260 is arranged and configured to switch and direct calls between the various coupled circuit.

Mode selection logic 230 is coupled to identification circuit 220, routing circuit 260, a memory arrangement 240, and a display controller 250. Mode selection logic 230 is adapted to select a telephony system operating mode responsive to detection, identity and call processing information. Mode selection logic controls display 188 through display controller 250 to display a first set of data in a first operating mode, and display a second set of data in a second operating mode. First and second data sets, and other operating parameters are stored in memory 240.

The present invention has been described with reference to particular embodiments and particular applications. These embodiments and particular applications are only examples of the invention's usefulness and should not be taken as a limitation. Various adaptations and combinations of features of the embodiments and particular applications disclosed, and other applications that may benefit from the above architectures and system operations, are within the scope of the present invention. Such embodiments and particular applications are examples only; the scope of the present invention is defined by the following claims.

What is claimed is:

1. A method for selecting an operating mode of a telephony system that is used in a closed facility and is communicatively-coupled to the Internet, comprising:
    detecting at least one person within a predetermined area, the area being associated with a telephone device in the telephony system;
    communicating a detection signal to the telephony system responsive to detecting the at least one person;
    operating the telephony system in a first operating mode responsive to the absence of the detection signal, and in a second operating mode responsive to receipt of the detection signal; and
    communicating via the Internet in response to the first or second operating mode.

2. The method of claim 1, further including displaying a first data set in the first operating mode, and a second data set in the second operating mode.

3. The method of claim 1, wherein detecting at least one person includes identifying and authenticating the identity of the at least one person.

4. The method of claim 1, further including disabling at least one of the operating modes in response to an inactive-user condition.

5. The method of claim 4, further including detecting that said at least one person is no longer within the predetermined area to provide the inactive-user condition.

6. The method of claim 2, wherein the first and second data sets each include operational mode information, and occupancy information for the predetermined area.

7. The method of claim 6, wherein operational mode information includes status of the telephone device located within the predetermined area.

8. The method of claim 7, wherein status includes information concerning at least one condition selected from the group consisting of: call-waiting, call-transfer, voice mail, "do not disturb," telephone device malfunction, and off-hook.

9. The method of claim 1, further including automatically routing calls designating a destination identifier over the Internet to a first telephone device in the first operating mode, and to a second telephone device in the second operating mode.

10. The method of claim 9, wherein the second telephone device is a telephone set located within the predetermined area.

11. The method of claim 9, wherein the first telephone device is a cellular telephone.

12. The method of claim 9, further including identifying the at least one detected person.

13. The method of claim 12, further including selecting the first and second telephone devices responsive to the destination identifier and detected presence of the at least one identified person.

14. A telephony system that is used in a closed facility and is communicatively-coupled to the Internet and has a selectable operating mode, comprising:
    means for detecting at least one person within a predetermined area, the area being associated with the telephony system;
    means for communicating a detection signal to the telephony system responsive to detecting the at least one person;
    means for operating the telephony system in a first operating mode responsive to the absence of the detection signal, and in a second operating mode responsive to receipt of the detection signal; and
    means for communicating via the Internet in response to the first or second operating mode.

15. The telephony system of claim 14, further comprising means for displaying a first data set in the first operating mode, and a second data set in the second operating mode.

16. The telephony system of claim 14, further comprising means for automatically routing calls designating a destination identifier over the Internet to a first telephone device in the first operating mode, and to a second telephone device in the second operating mode.

17. The telephony system of claim 14, further comprising means for identifying the at least one detected person.

18. A telephony system used in a closed facility having a selectable operating mode, comprising:
    a detection circuit adapted to detect at least one person within a predetermined area, the area being associated with the telephony system;
    a communication circuit adapted to communicate a detection signal to the telephony system responsive to detecting the at least one person; and
    a controller arrangement including an internet-communication interface adapted to operate the telephony system in a first operating mode responsive to the absence of the detection signal, and in a second operating mode responsive to receipt of the detection signal.

19. The telephony system of claim 18, further comprising a display arrangement adapted to display a first data set in the first operating mode, and a second data set in the second operating mode.

20. The telephony system of claim 18, further comprising a routing circuit adapted to automatically route calls designating a destination identifier over the Internet to a first telephone device in the first operating mode, and to a second telephone device in the second operating mode.

21. The telephony system of claim 18, further comprising an identification circuit adapted to identify the at least one detected person.

22. The telephony system of claim 18, further including means, responsive to an inactive-user condition, for disabling at least one of the operating modes.

23. The telephony system of claim 22, further including means for detecting that said at least one person is no longer within the predetermined area to provide the inactive-user condition.

24. The telephony system of claim 1, wherein detecting at least one person includes identifying and authenticating the identity of the at least one person and automatically configuring a computer for use by the at least one person according to profile information established for the at least one person.

* * * * *